Patented Nov. 20, 1951

2,576,080

UNITED STATES PATENT OFFICE 2,576,080

PLANT GROWTH REGULATION

Nathaniel Tischler, Palmyra, N. J., and Ernest P. Bell, Grosse Ile, Mich., assignors to Sharples Chemicals Inc., a corporation of Delaware No Drawing. Application March 11, 1949, Serial No. 81,026

14 Claims. (Cl. 71—2.5)

The present invention relates to an improved method and compositions for treating growing plants whereby the normal life cycle of a plant is altered with advantageous results. More particularly it relates to a process and compositions for treating growing plants with compounds which are considered to be derivatives of 3,6-endoxophthalic acid, the nature of which will be hereinafter more fully set forth.

Our process and compositions are unusually versatile both in respect to the types of response which they are capable of inducing, and the types of plants upon which they exert useful effects.

For example, they may bring about such effects as leaf abscission (partial or complete), blossom thinning, vine-kill, total destruction of the plant, adventitious root formation, or delay of fruit drop, the particular plant response manifested depending to a large extent upon the applied concentration of the response agent, and the species and degree of maturity of the plant undergoing treatment. In the case of adventitious root formation, the point or points at which the treatment is applied usually become involved.

While, under suitable conditions, any of the foregoing effects may be induced, depending upon the conditions of treatment, our process is particularly outstanding in the induction of phytotoxic effects such as defoliation or killing of plants and for convenience will be described more particularly with reference thereto. Defoliation is a mild phytotoxic effect of importance as applied to certain crops which usually defoliate normally during their life cycle, whereas plant kill is a drastic phytotoxic effect of importance in the extermination of weeds, grasses, etc.

It is well known that the presence of excessive foliage at the time of harvesting is undesirable in the case of many crops among which may be mentioned cotton, potatoes, soybeans, and tomatoes. This is particularly true if the crop is to be harvested mechanically. Controlled defoliation greatly facilitates harvesting, and in many circumstances also results in marked improvement in the quality and or ripening time of the product. Furthermore, the elimination of foliage, after it has served its primary purpose, may be effective in avoiding or minimizing certain late season blights, and/or other undesirable developments. Early defoliation of nursery stock is often desirable to permit the digging and preparation of the stock for shipment at a more convenient time.

By a defoliant is meant a substance which, upon contact in suitable concentration with a growing plant which normally tends to defoliate during its life cycle, brings about abscission of the leaves without causing complete destruction of the plant. The ultimate goal in defoliation might be considered to be complete abscission of leaves coupled with negligible injury to the rest of the plant insofar as the final maturation of the crop is concerned. A measure of the value of a defoliant, generally speaking, is the extent to which this ulitmate objective is attained. For practicable utility, moreover, the defoliating agent (i. e. defoliant) must be effective in relatively low concentrations. Additionally, since in actual practice 100% abscission of the leaves is rarely attainable, due to factors beyond the practicable control of the operator, it is usually desirable that the defoliant kill the non-abscissed leaves, since such leaves, if green, might cause discoloration or contamination of the crop during post-harvest processing, such as in the case of cotton. Then too the killing of any leaves which do not become abscissed frequently is of value in connection with the maturation of crops, and/or ease of harvesting, such as, by hand picking.

Various substances have been suggested as defoliants among which may be mentioned pentachlorophenol, cyanamides, sulfamates, fluorides, thiocyanates and chlorates. Insofar as we are aware, however, no outstandingly satisfactory defoliant has heretofore been developed.

Our invention, on the other hand, provides an effective and economical means of defoliating plants which undergo seasonal leaf abscission in the course of their normal cycle. It is of particular value commercially in the defoliation of cotton, Irish potatoes (i. e. the common white potatoes), sweet potatoes, soybeans, tomatoes, citrus trees, and other plants.

Our process also provides an economical and effective means of destroying vegetation including many species of herbs and grasses, particularly low-growing grasses. When our plant response agents are employed as weed killers it is usually desirable, though not essential, that they be applied to the weeds prior to full maturity, and preferably when said weeds (i. e. objectionable plants) are fairly young. In some instances, moreover, it may be desirable to kill useful crops, such as for military purposes or to control production, and our invention may advantageously be adapted to such objectives.

In the case of inducing adventitious root formation or rooting response this has practicable application, for example, in the stimulation of root formation at the base of cuttings.

In the practice of our invention we apply to the plant a compound which contains, as an essential part of its structure, a non-aromatic, oxygen-bridged, six-carbon ring which is substituted on each of two adjacent, non-bridged carbon atoms by a carbonyl group, the relative positions of the various carbon and oxygen atoms thus being as shown in the skeletal formula:

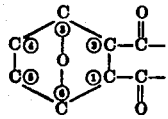

By a "non-aromatic" ring is meant a ring which does not contain the typical three double bonds of an aromatic ring arranged, such as, in benzene.

Acids, their anhydrides and their water-soluble acid and neutral salts containing this structure are capable of inducing striking responses in growing plants regardless of the nature of the other atoms or radicals which are present in the completed molecule. Such other groups or atoms may in certain instances exert a modifying effect upon the plant response activity of the molecule, and we prefer compounds in which the above indicated essential structure accounts for at least one-third, and more preferably at least half of the total molecular weight. We furthermore prefer that the number of substituents other than hydrogen attached to the carbocyclic ring not exceed three, and that not more than one of these be attached to a ring carbon which is alpha to a corbonyl group, i. e. on positions 1 and 2 in the above formula.

Typical groups which may be attached to the indicated unsaturated valences of each carbonyl group are, for example, hydroxy, metaloxy, such as sodiumoxy, potassiumoxy, etc., ammoniumoxy, alkylammoniumoxy, such as methylammoniumoxy, dimethylammoniumoxy, trimethylammoniumoxy, ethylammoniumoxy, diethylammoniumoxy, triethylammoniumoxy, propylammoniumoxy, dipropylammoniumoxy, methylethylammoniumoxy, etc., aralkylammoniumoxy, such as benzylammoniumoxy, dimethylbenzylammoniumoxy, etc., hydroxyalkylammoniumoxy, such as hydroxyethylammoniumoxy, di(hydroxyethyl)ammoniumoxy, tri(hydroxyethyl)ammoniumoxy, etc. It is to be understood, of course, that the carbonyl groups may be attached to different groups, respectively, to form, for example, acid salts, mixed salts, etc.

Generically the compounds resulting from attachment of the foregoing groups to the carbonyl radicals include dibasic acids, neutral salts and acid salts. Furthermore, the two carbonyl groups may be joined together through another atom, such as oxygen, to form the corresponding anhydrides.

The non-aromatic, carbocyclic ring may be saturated or unsaturated (except in the case of benzene ring unsaturation, which would make the ring aromatic). Groups which may be attached to one or more of the available carbon atoms of the ring include, for example, hydrogen, alkyl, such as methyl, ethyl, propyl, butyl and amyl, etc., halogen, such as chlorine, bromine, etc., acyl, such as formyl, acetyl, propionyl, butyryl, valeryl, etc., alkoxy, such as methoxy, ethoxy, propoxy, butoxy, amyloxy, etc., aryloxy, such as phenoxy, etc. and acyloxymethyl, such as formoxymethyl, acetoxymethyl, propionoxymethyl, butyroxymethyl, etc., and/or any other groups capable of such attachment.

Of the various classes of compounds containing the above-mentioned essential configuration, we have found that 3,6-endoxohydrophthalic acids together with the corresponding anhydrides, and salts are particularly useful in practice of my invention, and especially the acids, anhydrides and water-soluble salts, such as the alkali metal, ammonium and amine salts.

By 3,6-endoxohydrophthalic acids, we mean to signify all three degrees of ring saturation of the hypothetical 3,6-endoxophthalic acid, i. e. the di, tetra and hexahydro forms, to be more particularly discussed below. Thus particularly effective are 3,6-endoxohexahydrophthalic acid and derivatives thereof having structure defined by the formula

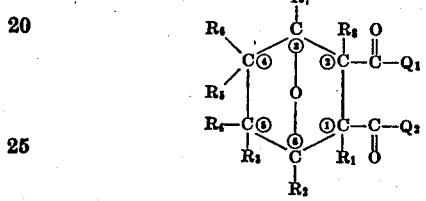

in which $Q_1$ and $Q_2$, taken individually, represent radicals chosen from the group consisting of hydroxy, metaloxy, ammoniumoxy, alkylammoniumoxy, and hydroxyalkylammoniumoxy, and taken collectively, represent a radical chosen from the group consisting of oxy, and metaldioxy radicals; and in which each of $R_1$, $R_2$, $R_3$, $R_4$, $R_5$, $R_6$, $R_7$ and $R_8$ represents a monovalent group or atom, such as, hydrogen, halogen, alkyl, acyl, alkoxy, aryloxy, acyloxymethyl or nitro radicals, and especially hydrogen. Examples of all of such substituents have been given above.

Substitution of ring-attached hydrogens by other radicals, such as those enumerated above, in certain instances results in useful modifications in physical and/or physiological properties of the compound, but frequently excessive substitution brings a reduction in plant response activity and, accordingly, we prefer that not more than 3, and more preferably not more than 2, of the 8 available positions on the ring be occupied by radicals or atoms other than hydrogen.

Also particularly effective are 3,6-endoxotetrahydrophthalic acids and derivatives thereof having structures defined by the formulae

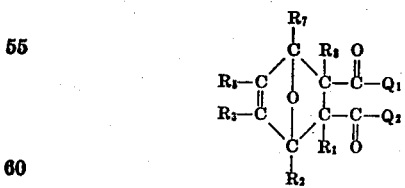

or

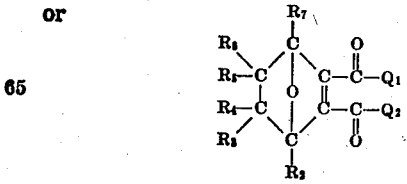

in which $Q_1$, $Q_2$, $R_1$, $R_2$, $R_3$, $R_4$, $R_5$, $R_6$, $R_7$ and $R_8$ (where appearing have the same meanings as before. Likewise, as in the case of derivatives of endoxohexahydrophthalic acid, it is preferable that not too many of the 6 available positions on the ring be occupied by radicals or atoms other than hydrogen, such as not more than 3, and preferably not more than 2.

A third group of very effective endoxophthalic acid derivatives comprises 3,6-endoxodihydrophthalic acid, and the corresponding anhydride, and salts. These may be represented by the formula

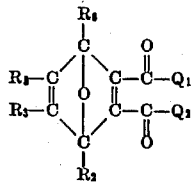

in which $Q_1$, $Q_2$, $R_2$, $R_3$, $R_5$ and $R_6$ have the same meanings as before. Likewise, substitutions on the ring are preferably limited to not more than 3, and preferably to not more than 2.

Specific illustrative examples of the above compounds are as follows: monosodium 3,6-endoxo-1,2,3,6-tetrahydrophthalate; disodium 3,6-endoxo-1,2,3,6-tetrahydrophthalate; monopotassium 3,6-endoxo-1,2,3,6-tetrahydrophthalate; dipotassium 3,6-endoxo-1,2,3,6-tetrahydrophthalate; calcium 3,6-endoxo-1,2,3,6-tetrahydrophthalate; magnesium 3,6-endoxo-1,2,3,6-tetrahydrophthalate; cupric 3,6-endoxo-1,2,3,6-tetrahydrophthalate; zinc 3,6-endoxo-1,2,3,6-tetrahydrophthalate; monoammonium 3,6-endoxo-1,2,3,6-tetrahydrophthalate; diammonium 3,6-endoxo-1,2,3,6-tetrahydrophthalate; mono-N-methylammonium 3,6-endoxo-1,2,3,6-tetrahydrophthalate; bis-N-methylammonium 3,6-endoxo-1,2,3,6-tetrahydrophthalate; bis-N,N-dimethylammonium 3,6-endoxo-1,2,3,6-tetrahydrophthalate; bis-trimethylammonium 3,6-endoxo-1,2,3,6-tetrahydrophthalate; bis-ethylammonium 3,6-endoxo-1,2,3,6-tetrahydrophthalate; bis-propylammonium 3,6-endoxo-1,2,3,6-tetrahydrophthalate; bis-amylammonium 3,6-endoxo-1,2,3,6-tetrahydrophthalate; mono(triethanolammonium) 3,6-endoxo-1,2,3,6-tetrahydrophthalate; bis(triethanolammonium) 3,6-endoxo-1,2,3,6-tetrahydrophthalate; monosodium 3,6-endoxohexahydrophthalate; disodium 3,6-endoxohexahydrophthalate; monopotassium 3,6-endoxohexahydrophthalate; monolithium 3,6-endoxohexahydrophthalate; diammonium 3,6-endoxohexahydrophthalate; mono-N-methylammonium 3,6-endoxohexahydrophthalate; bis(N-methyl-N-ethylammonium) 3,6-endoxohexahydrophthalate; mono-N-benzylammonium 3,6-endoxohexahydrophthalate; ferrous 3,6-endoxohexahydrophthalate; 3,6-endoxo-3,6-dihydrophthalic anhydride; disodium 3,6-endoxo-3,6-dihydrophthalate; 3,6-endoxo-4-chlorohexahydrophthalic acid; 3,6-endoxo-3-ethoxy-1,2,3,6-tetrahydrophthalic acid; disodium 3-acetoxymethyl-3,6-endoxo-1,2,3,6-tetrahydrophthalate; 3-methyl-3,6-endoxo-1,2,3,6-tetrahydrophthalic anhydride; 3-methyl-3,6-endoxohexahydrophthalic anhydride; 3,6-dimethyl-3,6-endoxo-1,2,3,6-tetrahydrophthalic acid; 3-acetyl-3,6-endoxo-1,2,3,6-tetrahydrophthalic acid; 3,6-endoxo-4,5-dichlorohexahydrophthalic acid; 3,6-endoxo-1-chloro-1,2,3,6-tetrahydrophthalic acid; sodium dimethylammonium 3,6-endoxo-1,2,3,6-tetrahydrophthalate.

The preparation of compounds of our invention may be accomplished by any means known to the art, and will be well understood by persons skilled in chemical synthesis upon becoming familiar herewith. An excellent method, for example, involves a Diels Alder condensation of furan or substituted furan with maleic anhydride or a substituted maleic anhydride or with other suitable dienophiles such as acetylene dicarboxylic acid. The product resulting from said condensation, usually an acid anhydride, may then be converted into other desired derivatives by treatment with the appropriate reagent or reagents. Thus by hydrolysis the acid is formed which may in turn be converted into its neutral or acid salts upon treatment with metal bases, ammonia or amines; salts of metals forming insoluble bases preferably being prepared by metathesis of a previously prepared water soluble salt.

Substituents on the ring may be obtained by suitable choice of reactants; acetylated furfuryl alcohol, for example, giving a Diels Alder adduct substituted in the 3 position. When maleic anhydride, chloromaleic anhydride or the like is the starting diene, the bridged ring will contain one double bond which, if desired, may then be hydrogenated, hydrochlorinated, chlorinated or subjected to any other addition reaction characteristic of ethylenic unsaturation. If acetylene-dicarboxylic acid is condensed with a furan, the resulting bridged ring will contain two double bonds to either or both of which may be added hydrogen or any of a wide variety of other groups.

Ring hydrogens may be substituted with active groups such as, for example, chlorine or bromine. Furthermore, substituents on the ring may themselves be substituted or reacted upon. Thus a hydroxyl group on the ring may be acylated, etherified, ammonated, etc. Likewise an aromatic substituent on the ring or elsewhere may be substituted by halogen, nitro, alkyl, hydroxyl, etc.

From the standpoint of present commercial practicability we prefer the Diels Alder adducts of furan with maleic anhydride or a dienophilic substituted maleic anhydride and the simple derivatives of said adducts. By a dienophilic maleic anhydride we mean one in which the substituents do not block the desired condensation with furan. By simple derivatives we mean those resulting from reactions of adducts of this kind and well known to the synthetic organic chemical art, for example, hydrolysis, and neutralization of the acid anhydride group; furthermore addition to the double bond by such reagents as hydrogen or halogen; or substitution of ring hydrogens, particularly in the 3, 4, 5 or 6 position by reactive regents such as halogen; and providing that such derivatives contain the essential structural unit hereinbefore identified. Other ways of preparing the compounds will immediately occur to persons skilled in the art.

It should be noted, however, that endoxophthalic acid derivatives having ring unsaturation require relatively mild temperatures, and in some instances special methods of synthesis will be desirable.

The following specific examples are illustrative of the preparation of our compounds.

EXAMPLE 1

*3,6-endoxo-1,2,3,6-tetrahydrophthalic anhydride*

40 mols of furan, 40 mols of maleic anhydride and 3 liters of isopropyl ether as diluent were introduced into an aluminum reaction vessel equipped with a dry ice, cooled reflux condenser and agitator. Reaction occurred spontaneously causing the mixture to reflux at temperature of about 35° C. After reacting at 35° C. or somewhat lower for 7 hours, the ether was removed by vaporization and the above identified product was obtained in 89% yield in the form of a solid cake. It was found to have, without further purification, a neutral equivalent of 81.5 as compared with a theoretical value of 83. This anhydride is relatively unstable at temperatures much above 50° C. and, accordingly, its derivatives are preferably prepared at temperatures below about 50° C.

EXAMPLE 2

3,6-endoxohexahydrophthalic acid 3 mols of the product of Example 1 were dissolved in 1400 ml. of water at 40° C., and to this solution was introduced 500 ml. of 28% aqueous ammonia, this corresponding to an excess of ammonia which was desirable to bring about complete solution of the salts produced. Said ammoniacal solution was charged into an autoclave together with 20 gms. of Raney nickel and was then treated with hydrogen at an average pressure of about 225 p. s. i. for about 4 hours. This process is described and claimed in Olin Patent 2,550,494, dated April 24, 1951, which was granted on co-pending application Serial No. 153,481, filed April 1, 1950. The resulting hydrogenated mass was filtered and acidified with an amount of concentrated HCl equivalent to the ammonia originally introduced, and the desired product was obtained by fractional crystallization from the solution. The wet crystals thus obtained were freed of water by evaporation in vacuo to give the above identified product in 75% yield. By refluxing a portion of the product with acetyl chloride, the dibasic acid was converted to the corresponding anhydride which separated as a precipitate. Said precipitate, after being freed of volatiles, was found to melt at 115° C. as compared with the literature value of 116°–117° C.

EXAMPLE 3

3,6-endoxo-2-chloro-1,2,3,6-tetrahydrophthalic anhydride

A solution was prepared containing 0.5 mols of furan, 0.5 mols of chloromaleic anhydride and 100 ml. of isopropyl ether. After standing at room temperature for 10 days, a substantial quantity of precipitate had formed which was filtered, washed with ether and dried at room temperature. The solid product contained 17.3% chlorine by analysis and had a neutral equivalent of 99.7 as compared with theoretical values of 17.7% and 100, respectively, for the above identified compound. The yield was 43%.

EXAMPLE 4

3,6-endoxo-3-methyl-1,2,3,6-tetrahydrophthalic anhydride

Substantially by the procedure of Example 1, 5 mols of 2-methyl furan (Sylvan) and 5 mols of maleic anhydride were reacted for several hours at reflux temperature (about 30° C.) in the presence of 500 ml. of diethyl ether. The white, crystalline product which precipitated from the solution was filtered, washed with additional ether, and freed of solvent to give the desired product in 71.5% yield.

EXAMPLE 5

3,6-endoxo-3,6-dimethyl-1,2,3,6-tetrahydrophthalic anhydride

The procedure of Example 4 was repeated but with the substitution of 2,5-dimethyl furan for the 2-methyl furan. The desired product was in this instance recovered in 67% yield and melted (without recrystallization) at 70°–74° C.

EXAMPLE 6

3,6-endoxo-4,5-dichlorohexahydrophthalic anhydride

A solution consisting of 0.5 mol of the product of Example 1 and 500 ml. of glacial acetic acid was introduced into a 1 liter, 3-necked flask immersed in a cooling bath. Chlorine gas was bubbled in gradually below the surface of the agitated reaction mixture while maintaining the temperature between 15° and 20° C. By the time 1 mol of chlorine had been introduced considerable amounts of solid product had separated from the mixture. This precipitate was filtered, washed successively with acetic acid and carbon tetrachloride and was subsequently freed of volatiles. The product thus obtained melted at 164°–167° C. and contained 28.7% chlorine by analysis as compared with the theoretical value of 29.6%. Its neutral equivalent was 117 as compared with the theoretical of 126. The yield was 67.5%.

EXAMPLE 7

3,6-endoxo-4,5-dibromohexahydrophthalic anhydride

The procedure of Example 6 was repeated with the exception that liquid bromine was introduced instead of gaseous chlorine. In this instance the product melted at 149°–152° C., contained 47% bromine as compared with a theoretical content of 49% and had a neutral equivalent of 316 as compared with a theoretical value of 326. The yield was 66%.

EXAMPLE 8

3,6-endoxo-3,6-dimethyl-4,5-dichlorohexahydrophthalic anhydride

By the procedure of Example 6, 0.5 mol of the product of Example 5 was treated with 1 mol of chlorine. In this instance the product did not crystallize from the reaction mass. It was recovered by diluting the reaction mass with hexane in which the chlorinated product is fairly insoluble. Further purification by recrystallization from hexane gave a product which melted at 96°–100° C. and contained 28.7% chlorine as compared with 26.5% calculated.

EXAMPLE 9

Metal salts of 3,6-endoxohexahydrophthalic acid

A 15% aqueous solution of the dibasic acid of Example 2 was completely neutralized with the calculated quantity of aqueous sodium hydroxide, thus providing an aqueous solution of the disodium salt. To an aliquot portion of this solution, containing 1 mol of the disodium salt, was introduced with stirring a concentrated aqueous solution containing 1 mol of cupric chloride. The desired copper salt was relatively, though not completely, insoluble and slowly precipitated from solution. The separated salt, after being washed and dried, was obtained in 50% yield and contained 28.5% copper by analysis, as compared with 25.9 theoretical, indicating some occlusion.

Treatment of a second portion of the solution of sodium salt with an equivalent quantity of zinc chloride resulted in the precipitation of the desired zinc salt which, after purification, had a zinc content corresponding closely to the zinc content of the compound, zinc 3,6-endoxohexahydrophthalate.

EXAMPLE 10

*Alkylammonium 3,6 - endoxo - 1,2,3,6-tetrahydro phthalates*

A methanol solution of 3,6-endoxo-1,2,3,6-tetrahydrophthalic acid (prepared by hydrolysis of the product of Example 1) was prepared. To a portion of this solution was introduced with stirring an amount of monoethylamine sufficient to neutralize both carboxyl groups, the temperature being maintained below 40 C. The methanol was then removed by application of vacuum while maintaining the temperature below 40° C., and the residue thus formed was washed with acetone, filtered and freed of solvent to yield the desired bis-ethyl ammonium salt in substantially theoretical yield. It was a white crystalline solid easily soluble in water.

The foregoing procedure was repeated with the substitution for the monoethylamine of the following amines, respectively: monomethylamine, monopropylamine, monobutylamine, monooctylamine, dimethylamine, diethylamine, diisopropylamine, dibutylamine, dioctylamine, trimethylamine, triethylamine, triisopropylamine, tributylamine and trioctylamine. In general the water solubility of the products thus obtained diminished with increase in the total number of carbon atoms in the substituent alkyl groups.

In another series of experiments the above enumerated amines were treated with the same dibasic acid, but in this instance the amount of amine introduced was equivalent to only one carboxyl group. The monobasic substituted ammonium salts thus obtained were found to be substantially less soluble in water and alcohol than the corresponding dibasic salts.

Compounds of the type described above are applied to the crop or plants in any desired manner, such as, in the form of a solid, for example, by dusting, or in the form of a liquid, for example, by spraying.

Compositions may be formulated by admixing the active ingredient with any desired liquid or solid carriers such as any of the finely divided solid carriers known in the dusting art, which are preferably of large surface area, such as a clay, for example, fuller's earth, pyrophyllite, talc, bentonite, kieselguhr, diatomaceous earth, etc.

Any of the commercial clays available on the market in finely divided form are highly satisfactory, and particularly those which are normally employed as insecticide carriers. Commercial clays, it will be understood, are generally identified by trade names (reflecting the source and mode of processing) of which Homer Clay, Celite, and Tripoli may be mentioned as typical.

Non-clay carriers which may be formulated with the active material include, for example, sulfur, volcanic ash, calcium carbonate, lime, by-product lignin, lignocellulose, flours such as of wood, walnut shell, wheat, soybean, potato, cottonseed, etc.

Any desired mixture may be prepared by any suitable method. Thus, if a solid, the active material may be ground to a fine powder and tumbled together with the powdered carrier, or the carrier and the active agent may be ground together; alternatively, the active material in liquid form, including solutions, emulsions and suspensions thereof, may be admixed with the finely divided carrier in amounts small enough to preserve the requisite free flowing property of the final dust composition, or excess liquid may be removed such as by vaporization, for example, under reduced pressure.

When solid compositions are employed, in order to obtain a high degree of plant coverage with minimum poundage per acre, it is desirable that the composition be in finely divided form. Preferably the dust containing the active ingredient should be sufficiently fine that substantially all will pass through a 50 mesh sieve, and more preferably, through a 200 mesh sieve. Excellent results have been attained in which the dust composition consisted predominantly of particles in the range from 15 to 45 microns. Finer dusts, such as those consisting largely of particles in the range of 5 microns and below, have excellent covering capacity, but are somewhat more subject to drift, and are more expensive to prepare.

For spray application the active ingredient may be dissolved or dispersed in a liquid carrier such as water or an oil. Suitable oils for herbicidal application include those of petroleum, animal, vegetable or synthetic origin such as kerosene, fuel oil, lubricating oil, soybean oil, linseed oil, castor oil, sperm oil, cod liver oil, etc. For defoliation or rooting response purposes, oils preferably are selected which in themselves are relatively harmless to the plant.

Aqueous solutions or dispersions are economical and desirable. In general, the choice of the particular liquid carrier employed may be guided somewhat by prevailing circumstances, such as, its availability, its solubility or dispersion characteristics toward the particular active agent employed, and/or its toxicity toward the plants undergoing treatment. In general, water is an excellent liquid carrier.

Thus spray formulations comprising the active ingredient in the form of a solution, suspension or emulsion in aqueous or non-aqueous media may be employed.

Emulsions or dispersions of the active ingredient in the liquid carrier may be prepared by agitation of the agent with the carrier. This is commonly done at the time of spraying. Preferably, however, the agitation should take place in the presence of an emulsifying or dispersing agent (surface active agent) in order to facilitate the preparation of said emulsion or dispersion and to increase its stability. Emulsifying and dispersing agents are well known to the art, and include, for example, fatty alcohol sulfates, such as sodium laurylsulfate, aliphatic or aromatic sulfonates, such as sulfonated castor oil or the various alkaryl sulfonates, such as the sodium salt of mono-sulfonated nonyl naphthalene, and non-ionic types of emulsifying or dispersing agents such as the high molecular weight alkyl polyglycolethers or analogous thioethers, such as the decyl, dodecyl and tetradecyl polyglycolethers and thioethers containing from 25 to 75 carbon atoms.

For convenience, the emulsifying or dispersing agent is mixed with the plant response agent prior to admixture with the carrier, and the preparation of the emulsion or dispersion is accomplished at the place where the spraying is to be undertaken merely by agitating said mixture with the carrier, particularly when aqueous. Solid plant response agents, if insoluble in the carrier, may be dispersed as such, or may be dissolved in a solvent, and emulsified by agitation with the carrier.

The concentration of surface active agent in the final emulsion or dispersion should be sufficient to make the phases readily dispersible, and in general from 0.02% to 2% is satisfactory. Thus, if the surface active agent is to be premixed with the plant response agent, the selected relative proportions of the two will largely depend upon the proportion of liquid carrier with which they are to be mixed. For most purposes mixtures containing the surface active agent to the extent of from about 1% to about 25% of the weight of plant response agent are highly satisfactory for the preparation of spray emulsions or dispersions. However, it is to be understood that the proportion may be varied over a wide range, as desired.

Emulsifying and dispersing agents usually also possess the properties of wetting agents, and in this capacity greatly assist in bringing about efficient contact between the liquid and the plant.

Although the active ingredient may be applied to the growing plant in concentrated form, it is usually desirable to employ liquid or solid formulations, for example as discussed above, in which the active ingredient constitutes less than 30% by weight of the total, such as less than 10% and even as low as 0.1%.

Other substances than the carrier and/or surface active agent may be included in the solid or liquid formulations, if desired, to accomplish various desired results such as the prevention of lumping during storage, or improvement in respect to coverage, moisture adsorption, adherence, etc. The purposes of such additions and the materials to be added are well known in the art and do not require elaboration.

In practice of our process as applied to defoliation, the rate of application (i. e. the amount of active ingredient per crop unit) for best results will depend among other factors upon the species of plants being treated, their maturity, and the chemical constitution of the defoliant.

A highly active compound such as sodium 3,6-endoxohexahydrophthalate is frequently effective in the defoliation of sweet potatoes, for example, when applied at the rate of only 0.1 pound per acre, and only under unusual circumstances is it necessary to apply more than 10 pounds per acre to obtain the desired results. Soybeans usually require somewhat higher rates of application, but generally from 1 to 25 pounds per acre is sufficient.

As a rule the more mature the plant at the time of application, the less active material is required. In practice the crop is normally treated, for defoliation purposes, two or three weeks prior to harvesting. In some instances, more than one application may be desirable, especially if heavy rains or winds should occur soon after the application. Then too, in order to avoid possible injury to any particular crop, it may be desirable for an inexperienced operator to apply the defoliant initially at a relatively low rate, and to follow with a second application, if necessary, after observation of the first effects, to obtain the degree of defoliation desired.

Effective rates of application, for defoliation purposes, may vary from as low as 0.1 pound per acre when defoliating a susceptbile plant at near maturity with a relatively active derivative, to as high as 50 pounds per acre when the plant is of a resistant species, and a less active derivative is employed. Use of dosages greatly in excess of the minimum required for good defoliation may result in shock to the plant with attendant injury to the remainder of the plant.

In fact, the defoliants of the present invention are effective herbicides when used in amounts substantially greater than those required for defoliation, and may be used advantageously for the killing of plants or vines (as in the case of potatoes) when desired, such as, for the killing of undesired plants, for example, weeds or grasses, or for the killing of crops, irrespective of whether such undesired plants or crops are of species which lend themselves to defoliation.

Thus when the defoliation is the objective the quantity applied should be sufficient to cause at least the major portion of the leaves to dry up and/or to drop from the living plant, but insufficient to cause substantial herbicidal action on the plant. On the other hand, when plant killing is the objective any amount sufficient for this purpose may be applied. In the latter connection, since different species of plants vary considerably in their relative resistance to herbicidal action, selective killing of plants species may be practiced.

Application of compositions of the present invention of the stems of plant cuttings promote the growth of roots at or near the zone of application. By such treatment of cuttings prior to planting we have found that the mortality is substantially reduced. A convenient and effective procedure is to mix the active ingredient with a viscous liquid or paste, such as lanoline or a high molecular weight ethylene oxide condensation product, i. e. a polyglycol ether. Any other viscous or pasty substances capable of adhering to the stem of the cutting may be employed for this purpose providing, of course, that it is not injurious to the stem. The amount of active agent necessary to induce rooting response is small and normally from 1 to 10 milligrams of active ingredient per cutting is sufficient. Use of excessive quantities is undesirable.

The following examples illustrate our invention (generally and without limitation to the specific active ingredient employed) as applied to the treatment of various plants, both under field and greenhouse conditions.

EXAMPLE 11

Field plots of soybeans, approximately 150 sq. ft. in area, were sprayed with aqueous solutions of 3,6-endoxo-$\Delta^4$-tetrahydrophthalic anhydride (at least largely in the form of the corresponding acid due to hydrolysis) at rates of 3 pounds per acre and 6 pounds per acre of active ingredient, respectively (based on the anhydride). The concentration of the solution at the lower rate was 0.5%, and at the higher rate was 1.0% (based on anhydride). Although the plants had not quite reached suitable maturity for optimum defoliation, it was observed after 12 days that about 15% defoliation had occurred and a substantial portion of the non-abscissed leaves were withered in the plots where 3 pounds per acre had been applied. At the 6 pound rate, 50% defoliation had occurred and practically no healthy leaves remained.

EXAMPLE 12

The procedure of Example 11 was repeated with the exception that the solution of the plant response agent contained 0.1% of a wetting agent. In this instance the extent of defoliation exceeded that of Example 11 at the end of 8 days and, after 12 days almost complete defoliation had occurred both at the 3 and the 6 pound per acre rates. In the plots where 3 pounds per acre were used, the vines were substantially unharmed whereas, at the higher rate there was evidence of slight injury.

EXAMPLE 13

30 sq. ft. field plots of nearly mature sweet potato plants were sprayed with dilute aqueous solutions of the compound of Example 1 at dosages of 6 and 12 pounds per acre, respectively. After 8 days all plants had undergone fairly complete defoliation. The vines were only slightly injured in the plots where the lower dosage was employed, but at the 12 pound rate appreciable blackening and shriveling of the vines was observed, which is usually desirable for harvesting purposes. Repetition of this procedure with the substitution of a commercial defoliant, ammonium thiocyanate as the active agent resulted in only insignificant defoliation, about 50% of the leaves being burned or withered at the higher rate of application.

EXAMPLE 14

Small garden plots of flowering cotton plants were sprayed with dilute aqueous solutions of the compound of Example 1 at rates of 2, 4, 8, and 16 pounds per acre, respectively. Defoliation was quite incomplete and with increase in dosage, a progressive increase in injury to the plant and blossoms was observed. This is in contrast with results attained by analogous treatment of mature cotton plants in which instance almost complete defoliation was observed at rates of application in the range from 2 to 10 pounds per acre with substantially no injury to the vine or bolls.

EXAMPLE 15

Small garden plots of black valentine beans, tomatoes and golden bantam corn, respectively, were sprayed with 0.5% aqueous solutions of the compound of Example 1 in amounts sufficient to wet the foliage. In the case of the beans and the tomatoes almost complete leaf abscission had occurred 8 days after treatment, the few adhering leaves being withered and dehydrated. The tomatoes showed slight injury to the terminal parts of the main stems. The corn, which is known to be incapable of undergoing leaf abscission, showed extensive injury and shriveling of the terminal sections of the leaves.

EXAMPLE 16

A large field overgrown with various weeds common to the New Jersey area was sprayed with aqueous solutions of the compound of the preceding examples at a rate of approximately 10 pounds per acre. Within a few days pronounced burning and destruction of golden rod, daisy and ragweed were apparent. At the other extreme, honey-suckle, switch grass and lamb's-quarter were only slightly affected, indicating that higher dosages are required for herbicidal action on these species.

EXAMPLE 17

A number of species of plants of the type commonly characterized as nursery stock were treated, about one month prior to normal defoliation, with aqueous solutions of the same chemical as employed in the preceding examples. In each instance the solution was sprayed on the foliage at concentrations of 1000, 1750 and 2500 parts per million, respectively. An appreciable hastening of defoliation occurred in the case of the following plants: white flowered Hibiscus, *Spiraea vanhoutte*, winged Euonymus, *Eleagnus umbellata*, *Euonymus alata compacta*, Thompson's privet and *Chenomeles japonica*. The effect was more marked in the case of plants treated with the highest dosage. No injury to the stem structure was observed.

EXAMPLE 18

Young bean plants were treated individually with the same compound as employed in the preceding examples in the following manner. 0.1 milliliter of an aqueous solution of said compound was applied to each of the two primary leaves of each plant. Some plants were treated with solutions of 0.1% concentration, others with solutions of 1.0% concentration, and observations were made after 2, 4 and 8 days, respectively. In the case of the 0.1% concentration, approximately 90% primary leaf abscission had occurred by the 8th day without appreciable injury to the plant, whereas at the 1.0% concentration 100% primary leaf abscission had occurred along with 20% plant mortality. For purposes of comparison, a similar procedure was followed in which ammonium thiocyanate, calcium cyanamide, sodium thiocyanate and sodium thiosulfate, respectively, were substituted for the endoxotetrahydrophthalic anhydride. In no instance was the defoliation more than 10% as complete.

EXAMPLE 19

The procedure of Example 18 was repeated but with the substitution of the disodium salt for the anhydride form of the active ingredient. Results were quite similar with the exception that no plants were killed.

EXAMPLE 20

Solutions of 3,6-endoxo-1,2,3,6-tetrahydrophthalic acid, of 3,6-endoxohexahydrophthalic acid and of their respective sodium salts were sprayed on potted plants at ½% concentration, and at dosages calculated to be from 0.38 to 18 pounds per acre. Pots containing relatively mature rye plants evidenced considerable burning of the leaves at dosages below 2 to 4 pounds per acre. At dosages above this range kill of the plants was obtained. Corn, another example of a monocotyledon behaves in a similar manner. The corn plants used were approximately 2 weeks old. Young shoots of alfalfa were slightly more sensitive. In this work the hexahydro acid and its sodium salt were approximately ⅓ more effective than the tetrahydro acid or its sodium salt.

An interesting and important characteristic of the plant response chemicals of the present invention is their ability to transmit their effects to portions of the plant considerably removed from the point of treatment. This behavior, which is known as translocation, is illustrated by the following example:

EXAMPLE 21

Young black valentine bean plants were treated with 1 mg. portions of a waxy mixture comprising 0.5% of 3,6-endoxo-1,2,3,6-tetrahydrophthalic acid, and 99.5% of a high molecular weight polyglycol ether (polymerized ethylene oxide) as carrier. The plants were divided into 7 groups and the paste containing the active ingredient was carefully applied to a specific portion of each plant. Application to plants of group 1 was made on the basal abscission plane of both primary leaves; to plants of group 2 on apical abscission lines of both primary leaves; to plants of group 3 on the center of mid-veins of primary leaves; to plants of group 4 on basal parts of mid-veins of primary leaves; to plants of group 5 on centers of first internode; to plants of group 6 on centers of hypocotyls; to plants of group 7 on leaves of first trifoliate.

At the end of 6 days in all instances considerable defoliation had occurred, involving the primary (2nd node) leaves.

The following example illustrates more particularly the herbicidal effect of the plant response agents of this invention when applied to the roots of a plant.

EXAMPLE 22

Young black valentine bean plants were grown in 3-inch pots containing soil in such a manner that a portion of the roots were exposed. 10 ml. of a 0.1% aqueous solution of 3,6-endoxotetrahydrophthalic acid was applied to the exposed roots. In all cases the plants were dead at the end of 7 days.

EXAMPLE 23

Transplanting of holly plants usually results in considerable loss unless the leaves are removed before moving. Manual plucking of leaves is a very tedious and expensive process. We have found that it is possible by practice of our invention to defoliate holly and successfully transplant the stripped bushes without loss.

American holly bushes approximately fifteen inches high were sprayed until all foliage and stems were thoroughly wetted with 0.1%, 0.50%, and 1.0% aqueous solutions of disodium 3,6-endoxohexahydrophthalate. All solutions contained 0.1% of a non-ionic wetting agent. Four plants were treated at each concentration. Average defoliation was 30% for the 0.1% treatment, 58% for the 0.50% treatment and 84% for the 1.0% treatment. All plants survived transplanting and quickly resumed growth.

The following example illustrates our invention as applied to the induction of rooting response.

EXAMPLE 24

Geranium cuttings were treated with 20 mg. of a 1% mixture of 3,6-endoxohexahydrophthalic acid in lanolin. The lanolin mixture was spread over the cut end and bottom half inch of the basal portion of each of twenty cuttings. The basal portions of the cuttings were then placed in moist sand, with approximately one-third of the length of the four inch long cutting buried. Thirty-five days after planting, during which time the sand had been kept moist, the cuttings were pulled up and examined. Seventeen of the cuttings had produced roots and three had died. Of the untreated, four had produced roots, fourteen had died and two were alive but had not rooted.

In another experiment the basal ends of the cuttings were soaked overnight in a water solution containing 250 parts per million of disodium 3,6-endoxohexahydrophthalate. These cuttings were planted as outlined above. Of twenty cuttings, fourteen produced roots, five died and one was alive but had produced no roots thirty-five days after planting.

In similar experiments with willow cuttings, all ten of ten cuttings produced roots by both methods. In the checks, seven of the ten rooted.

Reference is made to our co-pending applications Serial No. 131,501, filed December 6, 1949, and Serial No. 131,502, filed December 6, 1949, which are continuations-in-part of this application, and which describe and specifically claim certain subject-matter disclosed herein.

We claim:

1. A method for inducing plant response effects in a plant comprising applying to the plant a compound containing a 3,6-endoxohydrophthalic acid radical having less than three double bonds in the endoxocarbocyclic ring and when the carbon atoms of said ring which are alpha with respect to carbonyl are saturated, having a hydrogen atom on at least one of said carbon atoms, said compound being selected from the group consisting of the acids per se, their anhydrides and their water-soluble acid and neutral salts.

2. The method of claim 1 in which the endoxocarbocyclic ring per se plus two carbonyl groups account for at least one-third of the molecular weight of the compound of which they are a part.

3. The method of claim 2 in which at least one but not more than three substituents other than hydrogen and carbonyl are attached to the endoxocarbocyclic ring.

4. A method for defoliating a growing plant of a species which defoliates naturally, comprising applying to said plant, in sufficient quantity to cause the leaves to drop off, a compound of claim 3.

5. The method of claim 4 in which the plant to be defoliated is treated when near maturity.

6. The method of claim 1 in which the endoxocarbocyclic ring per se plus two carbonyl groups account for at least one-third of the molecular weight of the compound of which they are a part, in which at least one but not more than three substituents other than hydrogen and carbonyl are attached to the endoxocarbocyclic ring and in which a herbicidal quantity of the compound is applied to the plant to kill it.

7. The method of claim 6 in which the compound applied is 3,6-endoxo-3-methyl-1,2,3,6-tetrahydrophthalic anhydride.

8. A composition prepared for use as a plant response agent comprising a surface active agent, and a compound containing a 3,6-endoxohydrophthalic acid radical having less than three double bonds in the endoxocarbocyclic ring and, when the carbon atoms of said ring which are alpha with respect to carbonyl are saturated, having a hydrogen atom on at least one of said carbon atoms, said last-mentioned compound being selected from the group consisting of the acids per se, their anhydrides, and their water-soluble acid and neutral salts.

9. The composition of claim 8 in which the compound containing a 3,6-endoxohydrophthalic acid radical is of a molecular weight such that its endoxocarbocyclic ring per se plus two carbonyl groups account for at least one-third of the molecular weight of said compound of which they are a part.

10. The composition of claim 9 in which the compound containing a 3,6-endoxohydrophthalic acid radical has at least one but not more than three substituents other than hydrogen and carbonyl groups attached to the endoxocarbocyclic ring.

11. The composition of claim 10 and a carrier therefor.

12. The composition of claim 11 in which the carrier is a finely divided solid.

13. The composition of claim 8 in which the compound containing a 3,6-endoxohydrophthalic acid radical is of a molecular weight such that its endoxocarbocyclic ring per se plus two carbonyl groups account for at least one-third of the molecular weight of the compound of which they are a part, in which said compound has at least one but not more than three substituents other than hydrogen and carbonyl groups attached to the endoxocarbocyclic ring, and in which there is a liquid carrier for said composition.

14. The composition of claim 13 in which the carrier is aqueous.

NATHANIEL TISCHLER.
ERNEST P. BELL.

REFERENCES CITED

The following references are of record in the file of this patent:

UNITED STATES PATENTS

| Number | Name | Date |
| --- | --- | --- |
| 2,471,790 | Sowa et al. | May 31, 1949 |